US012121485B2

(12) United States Patent
Kuwahara et al.

(10) Patent No.: US 12,121,485 B2
(45) Date of Patent: Oct. 22, 2024

(54) ASSISTANCE DEVICE

(71) Applicant: GAMAKATSU CO., LTD., Nishiwaki (JP)

(72) Inventors: Hiroshi Kuwahara, Nishiwaki (JP); Norimasa Kamiya, Nishiwaki (JP); Takaaki Chin, Kobe (JP); Masanobu Fukumoto, Kobe (JP)

(73) Assignee: GAMAKATSU CO., LTD., Nishiwaki (JP)

( * ) Notice: Subject to any disclaimer, the term of this patent is extended or adjusted under 35 U.S.C. 154(b) by 0 days.

(21) Appl. No.: 17/272,911

(22) PCT Filed: Sep. 23, 2020

(86) PCT No.: PCT/JP2020/035692

§ 371 (c)(1),
(2) Date: Mar. 2, 2021

(87) PCT Pub. No.: WO2021/131185

PCT Pub. Date: Jul. 1, 2021

(65) Prior Publication Data

US 2022/0313521 A1 Oct. 6, 2022

(30) Foreign Application Priority Data

Dec. 25, 2019 (JP) ................................ 2019-234024

(51) Int. Cl.
*A61G 7/10* (2006.01)

(52) U.S. Cl.
CPC ......... *A61G 7/1015* (2013.01); *A61G 7/1019* (2013.01); *A61G 7/1042* (2013.01); *A61G 7/1086* (2013.01); *A61G 2203/30* (2013.01)

(58) Field of Classification Search
CPC .. A61G 7/1015; A61G 7/1019; A61G 7/1042; A61G 7/1086; A61G 2203/30;
(Continued)

(56) References Cited

U.S. PATENT DOCUMENTS 2,037,634 A * 4/1936 Klaskin .................. A47D 1/004
297/344.18
2,871,915 A * 2/1959 Hogan ................... A61H 3/008
D24/188
(Continued)

FOREIGN PATENT DOCUMENTS

AU 2018232823 A1 9/2019
CA 3055415 A1 * 9/2019
(Continued)

*Primary Examiner* — Justin C Mikowski
*Assistant Examiner* — Luke Hall
(74) *Attorney, Agent, or Firm* — BACON & THOMAS, PLLC

(57) ABSTRACT

An assistance device includes at least two flexible tubular members and a torso support configured to be attached to a torso of the person. Each tubular member is made of fiber reinforced plastic and has a base or upper end attached at least indirectly to a room. Leading or lower ends of the tubular members are connected to the torso support on opposing left and right sides thereof. The tubular members have a flexibility that enables them to bend to follow the person and exert a force restoring the person to an original upright sitting or standing posture.

15 Claims, 12 Drawing Sheets

(58) Field of Classification Search

CPC .. A61G 7/1051; A61G 7/1001; A61G 7/1007; A61G 7/1013; A61G 7/1023; A61G 7/1049; A61G 7/1059; A61G 7/1073; A61H 3/008; A61H 2003/007; A61H 2201/5058; A61H 2201/5084; A61H 2230/625; A47K 17/02; B29C 70/06; B29D 23/001

USPC .............................................................. 5/83.1

See application file for complete search history.

(56) References Cited

U.S. PATENT DOCUMENTS

| | | | | | |
|---|---|---|---|---|---|
| 3,780,663 | A * | 12/1973 | Pettit | A61G 7/1042 | 119/857 |
| 3,814,023 | A * | 6/1974 | Stantial | A61G 12/004 | 105/154 |
| 3,985,082 | A * | 10/1976 | Barac | A61H 3/008 | 105/148 |
| 4,252,063 | A * | 2/1981 | Brooks, Jr. | A61H 3/008 | 482/69 |
| 4,445,502 | A * | 5/1984 | Swan | A62B 35/0093 | 188/293 |
| 4,907,571 | A * | 3/1990 | Futakami | A61H 3/008 | 482/901 |
| 4,911,426 | A * | 3/1990 | Scales | A61H 3/008 | D6/333 |
| 4,948,118 | A * | 8/1990 | Miraglia | A61H 3/008 | 482/69 |
| 5,239,713 | A * | 8/1993 | Toivio | A61G 7/1044 | 177/144 |
| 5,487,195 | A * | 1/1996 | Ray | A61G 7/1057 | 5/89.1 |
| 5,526,893 | A * | 6/1996 | Higer | A61H 3/04 | 482/68 |
| 5,603,490 | A * | 2/1997 | Folsom | F16F 1/3665 | 267/282 |
| 5,603,677 | A * | 2/1997 | Sollo | A61H 1/0229 | 606/241 |
| 5,667,461 | A * | 9/1997 | Hall | A63B 69/0064 | 482/54 |
| 5,946,748 | A * | 9/1999 | Wang | A61G 7/1019 | 5/81.1 R |
| 6,079,578 | A * | 6/2000 | Dyson | A61H 3/008 | 212/338 |
| 6,302,828 | B1 * | 10/2001 | Martin | A61H 3/04 | 482/69 |
| 6,321,398 | B1 * | 11/2001 | Wang | A61G 7/1055 | 5/81.1 R |
| 6,637,610 | B1 * | 10/2003 | Cheeseboro | A61G 7/1042 | 212/327 |
| 6,666,796 | B1 * | 12/2003 | MacCready, Jr. | A61F 5/0102 | 135/65 |
| 7,163,492 | B1 * | 1/2007 | Sotiriades | A61H 1/0237 | 601/5 |
| 7,291,097 | B1 * | 11/2007 | Dace | A61H 3/008 | 482/69 |
| 9,901,759 | B2 * | 2/2018 | Galpin | A62B 35/0043 | |
| 11,135,119 | B2 * | 10/2021 | Sulzer | A61H 1/0262 | |
| 2002/0014568 | A1 * | 2/2002 | Faucher | B66C 7/02 | 104/126 |
| 2002/0185137 | A1 * | 12/2002 | Dubats | A61H 3/008 | 128/869 |
| 2003/0019020 | A1 * | 1/2003 | Reydel | A47K 17/02 | 434/247 |
| 2004/0002407 | A1 * | 1/2004 | Hawkes | A61H 3/008 | 482/69 |
| 2004/0116839 | A1 * | 6/2004 | Sarkodie-Gyan | A61H 3/008 | 601/33 |
| 2007/0294823 | A1 * | 12/2007 | Hay | A61G 7/1076 | 5/86.1 |
| 2013/0219615 | A1 * | 8/2013 | Eklof | A61G 5/14 | 5/83.1 |
| 2013/0318708 | A1 * | 12/2013 | Wang | A61G 7/1051 | 5/87.1 |
| 2014/0000025 | A1 * | 1/2014 | Hushek | A61G 7/1019 | 5/81.1 R |
| 2015/0250675 | A1 * | 9/2015 | Kalinowski | A63B 21/4034 | 482/69 |
| 2016/0166451 | A1 * | 6/2016 | Tekulve | A61G 7/1046 | 297/5 |
| 2018/0116896 | A1 * | 5/2018 | Chang | A61H 1/0292 | |
| 2019/0216674 | A1 * | 7/2019 | Maggu | A61H 3/04 | |
| 2021/0045952 | A1 * | 2/2021 | Ravari | A61G 7/1063 | |
| 2021/0228110 | A1 * | 7/2021 | Kamiya | A61H 3/04 | |
| 2022/0175598 | A1 * | 6/2022 | Kamiya | A61G 5/14 | |
| 2022/0192908 | A1 * | 6/2022 | Nomura | A61G 7/1086 | |
| 2022/0233880 | A1 * | 7/2022 | Troncone | A61H 1/0237 | |

FOREIGN PATENT DOCUMENTS

| | | | | |
|---|---|---|---|---|
| CN | 109414607 | A * | 3/2019 | A61H 3/00 |
| CN | 110381906 | A | 10/2019 | |
| DE | 29607024 | U1 | 7/1996 | |
| GB | 2418195 | A | 3/2006 | |
| GB | 2433061 | A | 6/2007 | |
| JP | H01238861 | A | 9/1989 | |
| JP | H09 313548 | A | 12/1997 | |
| JP | 2001 008981 | A | 1/2001 | |
| JP | 2001017486 | A | 1/2001 | |
| JP | 2001299835 | A * | 12/2002 | A61G 7/10 |
| JP | 2014223131 | A | 12/2014 | |
| JP | WO2018163307 | A1 * | 11/2019 | A61G 7/14 |
| WO | WO 88/07848 | A1 | 10/1988 | |
| WO | WO2005032446 | A1 | 4/2005 | |
| WO | WO 2018/043592 | A1 | 3/2018 | |
| WO | WO 2018/163307 | A1 | 9/2018 | |
| WO | WO2010108255 | A1 | 9/2020 | |

* cited by examiner

FIG. 2A
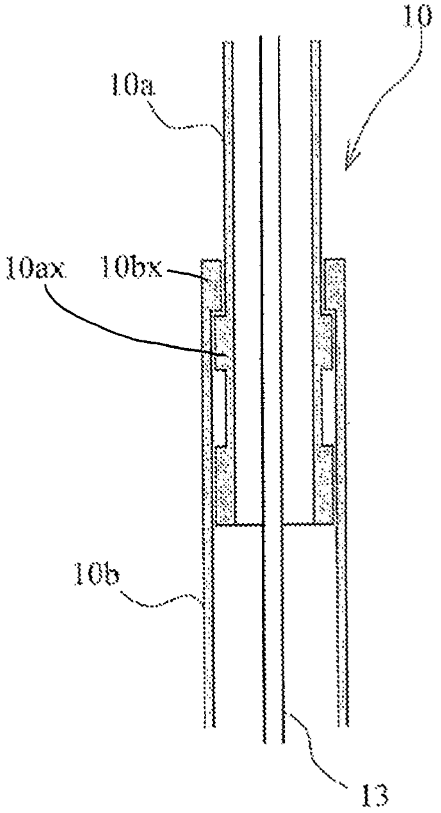
FIG. 2B
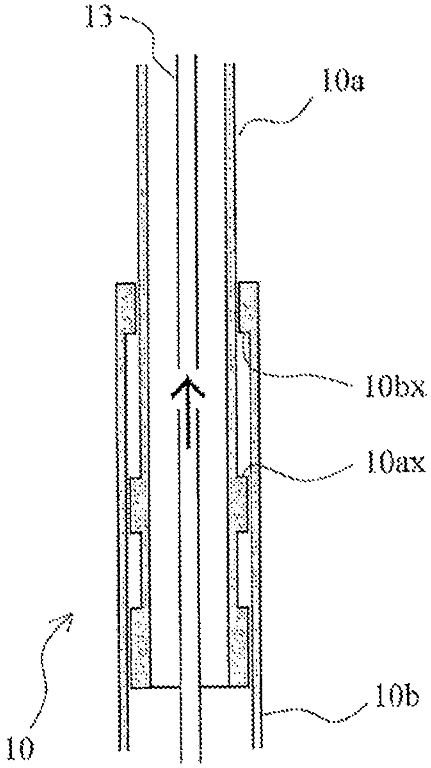
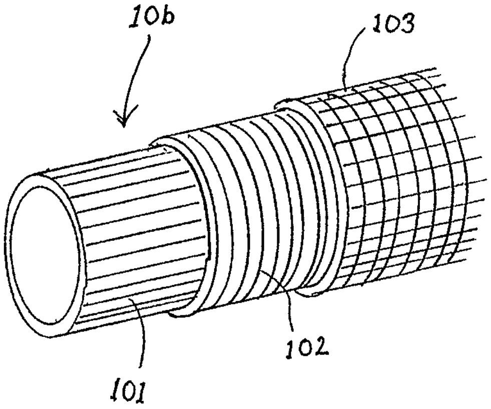
FIG. 2C

ASSISTANCE DEVICE

TECHNICAL FIELD

The present invention relates to an assistance device that can be used to assist elderly people and handicapped people.

BACKGROUND ART

Devices for assisting elderly people and handicapped people, for example, to relieve themselves at a toilet, are disclosed in PTLs 1 and 2, as described below.

PTL 1 discloses a device in which a wire or rope connected to the underside of a lifting means such as a chain block is connected to a belt to be wrapped around under a care receiver's armpits. The device supports the body weight of the person with wires or ropes, and the lifting means and the lifting means is configured to move along a path. Thus, the device can help the care receiver to move between a wheelchair and a toilet seat, i.e., to stand up and sit down, for example.

PTL 2 discloses a device that includes a support surface for supporting the buttocks and the hack of a care receiver and that can carry the care receiver from a living room (bed) to a toilet, a bathroom, a dining room, or the like. The device can carry the care receiver, for example, to a toilet, at which the support surface can be moved away from the buttocks or the like to allow the care receiver to sit on the toilet seat.

CITATION LIST

Patent Literature

PTL 1: Japanese Unexamined Patent Application Publication No. 2001-17486

PTL 2: Japanese Unexamined Patent Application Publication No. 2014-223131

SUMMARY OF INVENTION

Technical Problem

The device described in PTL 1 provides assistance by suspending the care receiver using a chain to be wound up by the lifting means and a wire or rope extending downward from the chain. If the care receiver unstably sways back and forth or left and right, the device cannot support that movement, because the chain and the wire or rope cannot support horizontally applied force. To prevent the care receiver from falling down even if the care receiver sways back and forth or left and right, it is necessary to support most of his/her body weight with the chain or the like. However, if the device supports most of the body weight, the care receiver does not use his/her residual ability to relieve himself/herself and as a result, the physical strength of the care receiver tends to decrease. In such a case, recovery and rehabilitation of physical function cannot be expected.

The device of PTL 2 is a device that carries the care receiver on the support surface to the toilet or the like, and help the care receiver to sit on the seat surface or the like, and thus opportunity for the care receiver to use his/her residual ability is further reduced. Thus, when the device is used, it is extremely difficult to maintain the physical strength of the care receiver and recover his/her function by motion of standing up and sitting down. In addition, the device for carrying a person to the toilet seat is large-scale device, and it is necessary to sufficiently reinforce the building. Thus, a considerable cost is needed to install the device.

Considering the above problems, the invention according to the present application is a low-cost and easy-to-install assistance device that can provide assistance to elderly people and handicapped people in a way to help and support them so as to utilize their residual ability.

Solution to Problem

A device according to the present invention is an assistance device to support a body of a care receiver, and in the assistance device, a base end of a pipe made of a fiber reinforced plastic is attached at an upper position in a room, and a leading end of the pipe is connected to a torso support configured to be attached to a torso of the care receiver. Examples of the fiber reinforced plastic used for forming the pipe include Carbon Fiber Reinforced Plastics (CFRP), Glass Fiber Reinforced Plastics (GFRP), and Aramid Fiber Reinforced Plastics. FIGS. 1A to 12C depict examples of the device according to the present invention.

The assistance device according to the present invention supports the body of the care receiver by the pipe made of the fiber reinforced plastic. Pipes made of a fiber reinforced plastic are used for fishing rods, golf clubs, etc., and have high strength and can be flexibly bent. The pipe being bent can softly exert a repulsive force while flexibly following the motion of the care receiver. Thus, in the device according to the present invention, if the care receiver makes an unstable movement, for example, unsteadily tilts forward, backward, leftward, or rightward, the pipe can bend to follow the care receiver and to exert, on the care receiver, an appropriate force in a direction that effects recovery of his/her original position or posture.

Thus, the assistance device can be configured to help or assist the care receiver to stand up and sit down using his/her residual ability without fully supporting the body weight of the care receiver. The assistance utilizing the residual ability makes it possible to achieve the effect of encouraging the care receiver to maintain physical strength and recover physical function.

In the assistance device according to the present invention, it is preferable that the base or upper end of the pipe or tubular member is attached at the upper position in the room, in a constrained state where the base end is not allowed to angularly displace in at least one direction, that is, not allowed to pivot or rotate about a first horizontal axis, and is limited in a range of angular displacement in a direction in which the base end is allowed to angularly displace, that is, allowed to pivot about a second horizontal axis, exemplarily orthogonal to the first horizontal axis. The pipe attached in such a manner can be seen in an exemplary device illustrated in FIG. 3 and the like. A base end of a pipe 10 in FIG. 3 cannot be angularly displaced, about an axis perpendicular to the plane of the drawing, to the left and right of the figure (the left and right as viewed from the care receiver), but can be angularly displaced, about an axis in the plane of the drawing, in the direction perpendicular to the figure (front-back direction as viewed from the care receiver), within a certain range (for example, ±45 degrees from the vertically downward direction).

If the base end of the pipe attached at an upper position in the room can be freely angularly displaced in any direction, that is, about any horizontal axis, the pipe cannot properly support the care receiver moving forward, backward, leftward, or rightward. However, in a toilet, a bathroom, a bedroom, etc., the care receiver typically moves in a specific direction (for example, in a toilet, the care receiver slightly moves or tilts his/her body in the front-back direction). Thus, a configuration in which the base end of the pipe is attached such that the base end cannot be pivoted about a first horizontal axis or angularly displaced in at least one direction (for example, the left-right direction), and can be pivoted about a different horizontal axis or angularly displaced in another direction (for example, the front-back direction) within a limited range, as described above, is suitable for supporting the care receiver.

In the assistance device according to the present invention, it is preferable that there are two of the pipes, and the leading ends of the pipes are connected to the torso support at the left and right of the care receiver, respectively. Using the two pipes can be seen in an exemplary device illustrated in FIGS. 1A and 1B and the like.

When the strength and rigidity (manner of bend) of the pipes are set appropriately, the care receiver can be appropriately supported regardless of the number of pipes. However, by using two pipes, it is possible to easily recover the posture of the care receiver by the repulsive force, and to exert a force in a reverse direction with respect to motion of rotating about the center of the body. Three or more pipes may be used, but in such a case, the cost of the device naturally increases as compared with the case of using two pipes.

It is particularly preferable that the two pipes are used in a state of being elastically bent so as to form left and right outward convex shapes (curves), respectively. In examples of FIGS. 10A to 10E, each of the two pipes 10 is connected to the torso support 30 in a state of being bent such that the two pipes 10 form left and right outward convex shapes, respectively. A distance W1 between the upper base ends 11 of the two pipes 10 is wider than a distance W2 between the two pipes 10 at the connection point with the torso support 30, and the base ends 11 of the two pipes 10 are attached in parallel by using supports 22. As a result, each of the pipes 10 is connected to the torso support 30 in a state of being convexly bent outward due to elastic deformation.

When the two pipes are connected to the torso support in a bent state as described above, the care receiver can be supported more stably than when the pipes are parallel. This is because, when the body of the care receiver is slightly tilted to the left or right, one of the two pipes is further bend and exerts a force in a direction that effects pulling back of the care receiver, while the degree of bending of the other pipe decreases and the force becomes close to zero, and thus sudden application of a strong force from both of the pipes to the care receiver can be prevented (see FIG. 10D). If parallel pipes are used and the body of the care receiver is slightly tilted to the left or right, as described above, both of the pipes are bent in the same direction, and thus a stronger force in a direction that effects pulling back of the care receiver, which is a net force from both of the pipes, will be exerted. As a result, the care receiver tends to be excessively moved in the opposite direction beyond the neutral point (see FIG. 11B).

It is preferable that the leading end of the pipe is connected to the torso support by a detachable insertion-type connector. In the example of FIGS. 12A to 12C, the pipe 10 and the torso support 30 are connected by using a detachable insertion-type connector (buckle) 50.

The leading end of each pipe and the torso support may be fixedly connected if they need not normally to be separated. However, in such a case, it is necessary to attach the torso support to the torso of the care receiver every time the care receiver goes to a place where the assistance device is provided (toilet, bathroom, and the like). Since the same torso support is attached to different care receivers having different body shapes, it may not be possible to achieve optimal holding due to the size mismatch, and a care receiver may start excretion before sitting on a toilet seat due to taking time to attach the torso support.

By using the detachable insertion type connectors to connect the leading end of the pipe to the torso support, as described above, a torso support suitable for the body shape of the care receiver can be used. In addition, by attaching the torso support to the care receiver in advance, for example, when the time for excretion is near, the torso support can be quickly connected to the leading end of the pipe in a toilet or the like.

In the above-described assistance device, it is preferable that the pipe has a telescopic structure having a variable length, a pull member (for example, a line member, a flexible bar member, or a member which is coupled to another component via a screw portion and of which rotation can cause upward and downward movement of the other component) is passed through the pipe, and the assistance device further includes an operation mechanism configured to move the torso support by operation of the pull member (an operation mechanism including a drive source, such as motor, or an operation mechanism that is manually operated). FIGS. 1A, 1B, 2A, 2B and FIG. 3, and the like depict an example in which the operation mechanism including a motor is provided on a ceiling portion of a toilet or the like. A line member (wire 13) is passed through the inside of the pipe 10, a connection portion 12 for connection with the torso support 30 and a winder 28 are connected by the line member. The wire 13 is operated by an operation mechanism 25 including a motor 26 and the like.

Such an assistance device can not only suppress motion of the care receiver of swaying back and forth or left and right, but also encouragingly help the care receiver to stand up or sit down. This is because, by driving the operation mechanism so as to pull up the pull member (for example, so as to wind up the line member) to pull up the torso support, a force can be exerted such that the care receiver (X in FIG. 3) is helped to stand up, and by operating the operation mechanism so as to gradually untighten and lower the pull member (for example, so as to wind off the line member), the care receiver can be assisted to sit down.

It is more preferable that the torso support is provided with a sensor configured to detect an abnormal motion of the care receiver. For example, an acceleration sensor or a gyro sensor may be attached as the sensor to detect that the care receiver staggers or falls down.

When the assistance device according to the present invention is used, it is possible to eliminate the need for being accompanied by a caregiver, for example, while the care receiver relieves himself/herself in the toilet. In that respect, the mental burden on the caregiver and the care receiver can be significantly reduced. Further preferable advantage of the ability of detecting abnormal movements of the care receiver by a sensor provided on the torso support, as described above, is that if anything should happen, the caregiver outside the toilet or the like can immediately respond to the situation.

In the assistance device including the pipe having a telescopic structure, and the pull member passed through the pipe and configured to be operated as described above, it is particularly preferable that the base end of the pipe is located at a position directly above where the care receiver sits or forward of the position. FIGS. 5A to 5E depicts an example of such a device (see in particular FIG. 5B).

In order to help the care receiver in a sitting posture to stand up, it is easier to pull up him/her slightly forward than to pull him/her straight up. This is because, as illustrated in FIG. 5A, the motion of standing up from a sitting posture includes shifting the body weight forward, followed by stretching upward. Thus, it is advantageous that the base end (upper portion) of the pipe is located forward of the position directly above where the care receiver sits.

It is particularly preferable that the base end of the pipe provided at a position directly above where the care receiver sits or forward of that position is located forward of the position directly above the care receiver such that the pipe is inclined by 0 to 45 degrees, when the care receiver in a sitting posture stands up.

This is because, according to the investigation by the inventors, the easiest way to help the care receiver in a sitting posture to smoothly stand up is pulling up the care receiver at an angle in the range (that is, the direction of the angle θ in FIG. 5B, where 0 degrees≤θ≤45 degrees) using the pipe inclined as described above. The most desirable range is 3 degrees≤θ≤20 degrees.

It is also preferable that the base end of the pipe is attached to an upper support unit, and a part of or the entirety of the upper support unit is configured to horizontally move so as to move the base end of the pipe forward and backward ("forward" and "backward" mean forward and backward as viewed from the care receiver in a sitting posture) in a range including a position directly above where the care receiver sits. FIGS. 7A to 7C depict an example of a device capable of such horizontal movement.

If the upper support unit moves horizontally and the base end of the pipe also moves, as described above, the device according to the present invention can not only pull up the care receiver in the most appropriate direction to assist him/her to stand up, sit down, or otherwise move, but also help the care receiver to move forward and backward within a certain range. In addition, use of a flexible and resilient pipe understandably allows for appropriately supporting motion of the care receiver unstably swaying back and forth or left and right. In addition, it is possible to put away the pipe and the like near the rear wall or the like when not in use, because the base end of the pipe can also be moved to the rear of the care receiver.

It is also preferable that the base end of the pipe is attached to an upper support unit, and a part of or the entirety of the upper support unit is configured to rotate so as to horizontally revolve (the position of) the base end of the pipe along a circumferential path. FIGS. 8A to 8C depict an example of such a device.

When the base end of the pipe can revolve horizontally, as described above, the care receiver to which the torso support attached can smoothly stand up from the wheelchair, turn his/her body and sit down on the toilet seat, and then again turn his/her body and return to the wheelchair.

It is preferable that the above-described assistance device is configured to provide assistance for the care receiver to stand up and sit down, and transfer to and from a wheelchair with help of one healthy person (that is, assistance by one person).

Understandably, the ability of providing assistance by one person significantly reduces burdens on the caregiver. Typically, toilets and bathrooms are small, and thus it is not rare that assistance by one person facilitates smooth assistance.

The above-described assistance device including the pipe made of a fiber reinforced plastic for supporting the care receiver enables assistance by one person in some type of assistance which require two people if the assistance device is not used. In addition, for example, when the sensor is provided in the torso support as described above, it is possible to put the care receiver in an unmanned assistance state during relieving himself/herself in a toilet, and thus protection of his/her dignity can be facilitated.

It is preferable that the pipe includes a plurality of tubes having different diameters and telescopically connected, a tube on the outside includes, at one end thereof, an engaging step facing inward, and a tube fitted into the tube on the outside includes, at one end thereof oriented in a reverse orientation with respect to the end having the engaging step facing inward, an engaging step facing outward. FIGS. 2A and 2B depicts an example (longitudinal cross-sectional view) of such a pipe. FIG. 2A depicts the pipe 10 in the most extended state, and FIG. 2B depicts the pipe 10 not in the most extended state.

In typical pipes formed by telescopically connecting a plurality of tubes having different diameters (for example, in a general fishing rod), when such a pipe is extended, a tapered surface formed in the inner surface of an end of a tube on the outside and a tapered surface formed in the outer surface of an end of a tube fitted into the outside tube are fitted to each other, and thus the tubes are connected with each other in a manner that the tubes are prevented from falling out from another tube. However, in such a structure, the tapered surfaces may be excessively tightly fitted to each other when the pipe is extended, and thereafter smooth sliding motion between the tubes for shortening the pipe may be difficult.

When a tube on the outside includes, at an end thereof, an engaging step facing inward, and a tube on the inside includes, at an end thereof, an engaging step facing outward, as in the above-described pipe, a situation where the tapered surfaces are excessively tightly fitted to each other and thereafter the pipe cannot be shortened smoothly does not occur. This is because, when the pipe is extended, the engaging step facing inward of the tube on the outside comes into contact with the engaging step facing outward of the tube on the inside (see FIG. 2A), and thus the tubes are connected with each other in a manner that the tubes are prevented from falling out from another tube and prevented from tightly fitted to each other.

Further, it is preferable that the pipe is made of a fiber reinforced plastic and has a layered structure including a layer of fibers (for example, carbon fibers) extending in a length direction of the pipe and a layer of fibers (for example, carbon fibers) extending in a circumferential direction (or, in the circumferential direction and an oblique direction) of the pipe.

Fiber reinforced plastics are lightweight, high-strength plastics used for golf club shafts, fishing rods, and the like. As described above, when the pipe has a layered structure including a layer of fibers extending in the length direction and a layer of fibers extending in the circumferential direction of the pipe, the pipe can exhibit strength regardless of a direction of applied force and can be prevented from being folded or broken. Thus, when the above-described pipe is used for the assistance device according to the present invention, the device can be lightweight, and by virtue of the high strength of the pipe, can strongly and firmly support the care receiver.

It is preferable that the outermost tube (that is, the thickest tube) of the plurality of tubes of the pipe having different diameters is connected to the torso support, as the leading end. In the examples of FIGS. 1A, 1B, 2A, 2B and FIG. 3 and the like, an outermost tube 10*c* is connected to the torso support 30.

The care receiver may grasp, by hand, the tube connected to the torso support, because that tube is located near the care receiver. If the tube is a thinner tube in the above-described pipe (that is, a tube fitted into another tube), the thinner tube will move into a thicker tube when the pipe is shortened, and thus there is a risk that the hand holding the tube gets caught in the gap between the tubes. In addition, if the base end of the thickest tube is attached at an upper position in the room in a state of being limited in angular displacement, the range in which the leading end of the pipe can be displaced due to bending becomes narrower, and the movable range of the care receiver also becomes narrower. In that respect, as described above, when the outermost and thickest tube in the above-described pipe is connected to the torso support as the leading end, it is possible to eliminate the risk that the hand of the care receiver holding the tube gets caught in the gap between the tubes, and to allow the care receiver to move in a wider range.

It is also preferable that the base end of the pipe is attached to an upper support unit, and the upper support unit is detachably attached to an upper portion of a support frame configured to be self-supported on a floor of the room. FIG. 9A depicts an example in which such an assistance device, that is, the upper support unit 20 to which the base end of the pipe 10 is attached is attached on the support frame illustrated in FIG. 9B.

With such an assistance device, it is possible to appropriately assist an elderly person or the like to stand up and sit down even in a room where (the base end of) the pipe cannot be attached to a ceiling portion or the like or even at a place other than a place of residence. It is particularly preferable that main parts of the support frame are made of a lightweight and high-strength material such as a carbon fiber reinforced plastic, because such a frame can be easily carried and assembled at any place as required.

As a means for supporting the above-described assistance device, it is also preferable to provide a support frame configured to be self-supported on a floor of a room, and further configured such that the base end of the pipe is detachably attached to an upper portion of the support frame.

Such a support frame allows for attaching the base end of the pipe at an upper position to construct the assistance device, even at a place where the pipe cannot be attached to the ceiling portion or the like, as described above. Thus, it is possible to provide assistance in excretion and the like in various places.

Effect of Invention

The assistance device according to the present invention is configured to support the body of the care receiver by a pipe made of a fiber reinforced plastic that has high strength and can be flexibly bent. Thus, the assistance device can support the care receiver by exerting a repulsive force while flexibly following the motion of the care receiver. As a result, the assistance device can help or assist the care receiver to move using his/her residual ability, and thus can encourage the care receiver to maintain and recover his/her physical strength and function to rehabilitate himself/herself.

It is also possible not only to suppress motion of the care receiver of unsteadily tilting forward, backward, leftward, or rightward, but also to encouragingly help the care receiver to stand up or sit down, when the pipe has a telescopic structure, the pull member, such as a line member, is passed through the pipe, and the assistance device further includes the operation mechanism configured to move the torso support by operation of the pull member.

When an appropriate sensor is provided in the above-described torso support, the sensor can detect that the care receiver staggers or falls down. Thus, even if the care giver and the care receiver are separated, for example, in a case where the care receiver relieves himself/herself alone, it is possible to respond immediately to an unexpected situation.

The configuration in which the base end of the pipe is attached to the upper support unit, and the upper support unit is detachably attached to an upper portion of the support frame configured to be self-supported on a floor of the room, makes it possible to appropriately assist an elderly person or the like, even in a place where the pipe is not attached, for example, a place other than a place of residence.

BRIEF DESCRIPTION OF DRAWINGS

FIG. 1A depicts a state in which pipes 10 are extended, and FIG. 1B depicts a state in which the pipes 10 are shortened.

FIGS. 2A and 2B are longitudinal cross-sectional views of a part of the pipe 10 (a joint portion between tubes) used in the assistance device 1 illustrated in FIGS. 1A, 1B and FIG. 2A depicts a state in which the pipe 10 is extended, and FIG. 2B depicts a state in which the pipe 10 is shortened.

FIG. 2C is a schematic isometric view of a flexible pipe or tubular member of an assistance device pursuant to the present invention.

FIG. 4A depicts a state in which the care receiver X sits on a toilet seat Y, and FIG. 4B depicts a state in which the care receiver X stands up from the toilet seat Y.

FIG. 9A depicts an assistance device 4 in which the upper support unit 20 including the pipes 10 and the like is attached to an upper portion of a support frame 40, and FIG. 9B depicts the support frame 40.

FIGS. 10A to 10E depict an assistance device 5 in which the pipe 10 is used differently from the assistance devices 1 to 4 illustrated in FIGS. 1A and 1B and the like. FIG. 10A depicts a state in which the care receiver X sits on the toilet seat Y, and FIG. 10B depicts a state in which the care receiver X stands up from the toilet seat Y. FIGS. 10C to E depict a state in which the care receiver X using the device 5 sits straight on the toilet seat Y, a state in which the care receiver X is slightly tilted to the right side of the care receiver X, and a state in which the care receiver X is greatly tilted to the same side, respectively.

FIG. 12A is a rear view illustrating the connection between the back side portion of the torso support 30 and the pipes 10, and FIGS. 12B and 12C are detailed views of a connected state by the connector 50 (and a disconnected state).

DESCRIPTION OF EMBODIMENTS

Figure 1A:
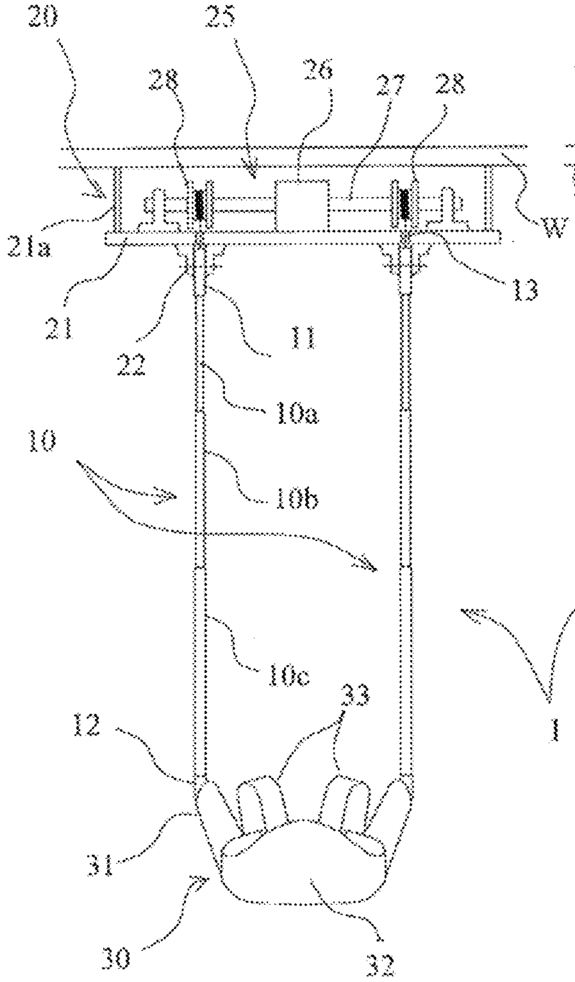
FIGS. 1A and 1B are front views of an assistance device 1 as an embodiment of the present invention.

An embodiment of an assistance device according to the present invention is illustrated in FIGS. 1A to 6B. As illustrated in FIGS. 1A and 1B, in an assistance device 1, base ends 11 of two pipes 10 are attached to an upper support unit 20 fixed to a ceiling portion W, and a torso support 30 is connected to leading ends (i.e., lower ends) of the pipes 10.

A support plate 21 is fixed to the underside of the ceiling portion W via connection members 21*a*, and the support plate 21 is used to provide the upper support unit 20 including pipe supports 22 and the like, as illustrated in the figure. The base ends 11 of the pipes 10 are attached to the pipe supports 22 of the support plate 21. The upper support unit 20 and the like including the support plate 21 can withstand external force due to the body weight and movement of a care receiver X (see FIG. 3 and the like).

The torso support 30 connected on the lower side is for supporting the care receiver X, and has a portion 32 to be wrapped around the chest (near the armpits) of the care receiver X and portions 33 to be put around both shoulders of the care receiver X. The torso support 30 has a structure that can be easily wrapped and unwrapped, and is formed using a soft material having a pleasant feel (for example, rubber or cloth). Between the pipe 10 and the torso support 30, connecting hands 31 extend from the connection portions 12 each provided at the leading end of the pipe 10. Ends of the connecting bands 31 are connected to the torso support 30 (left and right portions on the back side of the torso support 30, respectively).

A sensor (not illustrated) capable of detecting an abnormal movement of the care receiver X and notifying the outside of the room is attached to the torso support 30. An acceleration sensor or a gyro sensor is attached as the sensor to detect that the care receiver X staggers or falls down. By using such a sensor, safety of the care receiver X can be ensured without accompaniment by a caregiver in the toilet, for example, while the care receiver X relieves himself/herself in the toilet. Thus, the mental burden on both of the caregiver and the care receiver can be significantly reduced, and the dignity of the care receiver can be protected.

The pipe 10 connecting the upper support unit 20 and the torso support 30 is formed by connecting a plurality of tubes having different diameters, telescopically (in a nested manner), such that the pipe 10 can be extended and shortened as a whole. Specifically, the thinnest tube 10*a* is coupled to the base end 11, and a slightly thick tube 10*b* to be located at a lower position than the tube 10*a* is connected to the tube 10*a* so as to be slidable with respect to the tube 10*a* in the length direction. Further, a thick tube 10*c* to be located at a lower position than the tube 10*b* is connected to the tube 10*b* so as to also be slidable with respect to the tube 10*b*. The length of the pipe 10 can be changed between a state illustrated in FIG. 1A and a state illustrated in FIG. 1B by sliding the thinner tube into and out from the inside of the thicker tube. The reason why the outermost and thickest tube 10*c* is provided at the lower section of the pipe 10 and the leading end (connection portion 12) of the tube 10*c* is connected to the torso support 30 is that the hand of the care receiver X with the torso support 30 wrapped around his/her chest, is prevented from getting caught in the connection point between the tubes, when the care receiver X grasps the lower portion of the pipe 10, and that the movable range of the leading end of the pipe 10 is widened.

In the illustrated example, three tubes are connected telescopically as the pipe 10, but the number of the tubes is not limited to three. Two tubes or four or more tubes may be connected in the same manner, or only one tube (hence the tube itself cannot be extended or shortened) may be inserted to the support plate 21 or the ceiling portion W so as to slide in and out from the support plate 21 or the ceiling portion W.

Each of the tubes 10*a* to 10*c* of the pipe 10 is made of a carbon fiber reinforced plastic (CFRP) so as to have sufficient strength, be easily bent, and generate an appropriate repulsive force when bent. The tube that is employed, for instance, tube 10*c*, has a layered structure (see FIG. 2C) formed by layering a layer 101 of carbon fibers (prepreg) arranged in the length direction of the tube and a layer 102 of carbon fibers (prepreg) arranged in the circumferential direction of the tube, such that the tube can exhibit high strength regardless of a direction of applied force. Further, in each of the tubes 10*a* to 10*c*, a layer 103 of woven fabric woven with carbon fibers extending in two directions intersecting with each other is provided in the outer surface (outermost layer) that may be directly touched by the care receiver X, and a layer of woven fabric woven with glass fibers extending in two directions in a similar manner is provided in the inner surface (innermost layer) which may come into contact with human hands in case of accidental breakage. This configuration is for preventing the fibers from being exposed on the outer and inner surfaces to avoid the user from being injured.

Each of the tubes of the pipe 10 may be made of a fiber reinforced plastic using fibers other than carbon fibers. If another fiber reinforced plastic is used, it is also preferable to adopt: the same layered structure as described above regarding the arrangement of the fibers.

For each of the tubes 10*a* to 10*c* telescopically connected to each other, as described above, a structure illustrated in FIGS. 2A and 2B are adopted at the connection point between the ends of tubes so that the two pipes adjacent to each other always smoothly slide in the length direction. Specifically, a structure in which the tube 10*b* on the outside includes, at the upper end thereof, an engaging step 10*bx* facing inward, and the tube 10*a* fitted into the tube 10*b* includes, at the lower end thereof, an engaging step 10*ax* facing outward, as illustrated in FIG. 2B, is used. The inward facing step 10*bx* and the outward facing step 10*ax* are formed by winding the carbon fiber more onto the portions or attaching a metal ring to the portions. The height (height difference) of the step is 0.2 to 2.0 mm in the radial direction (and a surface perpendicular to or substantially perpendicular to the length direction is formed). When the pipe 10 is fully extended, the connection portion of FIG. 2B is changed to the state of the FIG. 2A, the engaging step 10*bx* comes into contact with the engaging step 10*ax*, and thus the tube 10*a* is prevented from falling out from the tube 10*b*. Unlike the case where coupling tapers are provided at the ends of the inner and outer tubes to prevent falling out, when the connection portion is configured as illustrated in the figures, a situation where the tubes are tightly fitted or fixed to each other and sliding and extension/shortening become difficult does not occur. Note that, at the connection portion between the tube 10*c* and the tube 10*b* (not illustrated), a step facing inward and a step facing outward are formed, as illustrated in FIGS. 2A and 2B as to the tube 10*b* and the tube 10*a*.

Figure 1B:
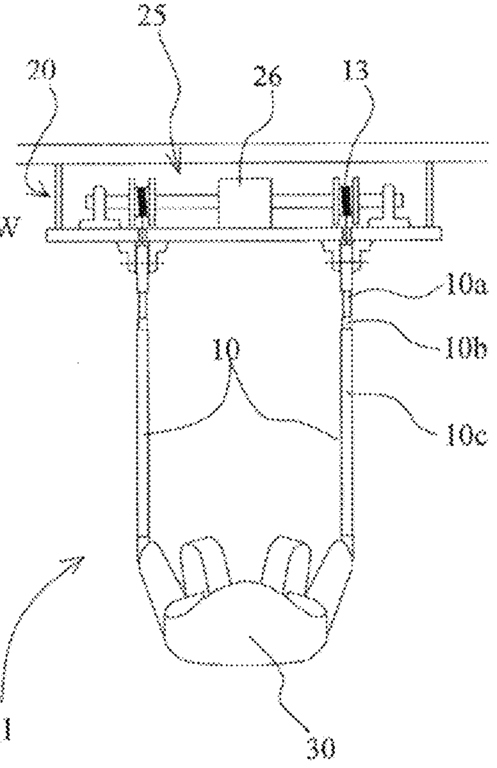

In the illustrated assistance device 1, a wire 13 is passed through the inside (hollow portion) of the pipe 10 that can be extended and shortened, as illustrated in FIGS. 2A and 2B. The lower end of the wire 13 is connected to the connection portion 12 of the pipe 10 illustrated in FIGS. 1A and 1B, and the upper end of the wire 13 extends outward through an upper end opening at the base end 11 of the pipe 10, and is wound around a winder 28 of an operation mechanism 25 provided on the upper support unit 20. The operation mechanism 25 rotationally drives the winder 28 and a shaft 27 in both forward and reverse directions by a motor with a speed reducer 26. By rotating the winder 28 in either direction, the wire 13 passed through the pipe 10 can be moved upward or downward. When the wire 13 is wound up, the pipe 10 can be shortened and the torso support 30 can be moved upward, as illustrated in FIG. 1B, and when the wire 13 is lowered, the torso support 30 can be moved downward, as illustrated in FIG. 1A. The care receiver X or the caregiver can use a handheld operation transmitter for remote control to turn the operation mechanism 25 on/off or the like.

A rope (for example, a rope made of Kevlar fiber) may be used instead of the illustrated wire 13. Instead of a line member such as a wire or a rope, it is possible to use a variety of pull members, for example, a flexible bar member, or a member which is coupled to another component via a screw portion and of which rotation causes upward and downward movement of the other component (i.e., a bar-like member including a screw portion).

Although, in the device 1 of FIGS. 1A and 1B, the operation mechanism 25 includes the motor 26 and configured to be operated using a switch, the operation mechanism 25 may be configured to be manually operated. It is possible to provide a mechanism including, instead of the motor 26, a manually driven gearbox (including a ratchet mechanism, or the like, for example) provided at an upper portion, in which the gearbox is driven by a handle such as an operation rod and a transmission means at a lower portion (on the floor) to rotate the shaft 27.

As illustrated in FIGS. 1A and 1B, the base end 11 connected to the uppermost portion of the pipe 10 is a disk-shaped metal plate including, in a lower potion thereof, a hole in which the upper end of the cylinder 10*a* is inserted and held, and further including a horizontal support shaft at or near the center of the base end 11. The base end 11 is sandwiched from both sides by the pipe supports 22 fixed to the support plate 21 such that the support shaft of the base end 11 are rotatably held by the pipe supports 22. Thus, the base end 11 and the uppermost portion of the pipe 10 cannot be angularly displaced in a direction that effects tilting to the left or right in FIGS. 1A and 1B, and can be angularly displaced so as to rotate only in the direction perpendicular to the paper plane of FIGS. 1A and 1B. However, the base end 11 and the support 22 are provided with protrusion shaped engaging portions (not illustrated) that come into contact with each other to prevent further rotation, when the base end 11 rotates by a certain angle, and thus angular displacement in the direction perpendicular to the paper plane of the figure is allowed within a limited predetermined range (±45 degrees or a narrower range from the vertically downward direction of the pipe support 22).

The assistance device 1 configured as described above can appropriately support the body of the care receiver X by the pipe 10, when the torso support 30 on the lower side is wrapped around the chest or shoulders of the care receiver X. The pipes 10 made of a fiber reinforced plastic have high strength and can be flexibly bent, and thus if the care receiver X unsteadily tilts forward, backward, leftward, or rightward, the pipes 10 can exert a repulsive force (resilient force) while flexibly following the motion of the care receiver, to apply a force to the care receiver X so as to recover a normal posture.

Thus, the illustrated assistance device 1 can be useful for supporting a care receiver with weakened legs in a place where the care receiver stands up or sits down, for example, a toilet, a bathroom, a bedroom, or the like. The function and the like of the assistance device 1 will be described below with reference to an example of supporting excretion of a care receiver in a toilet.

Figure 3:
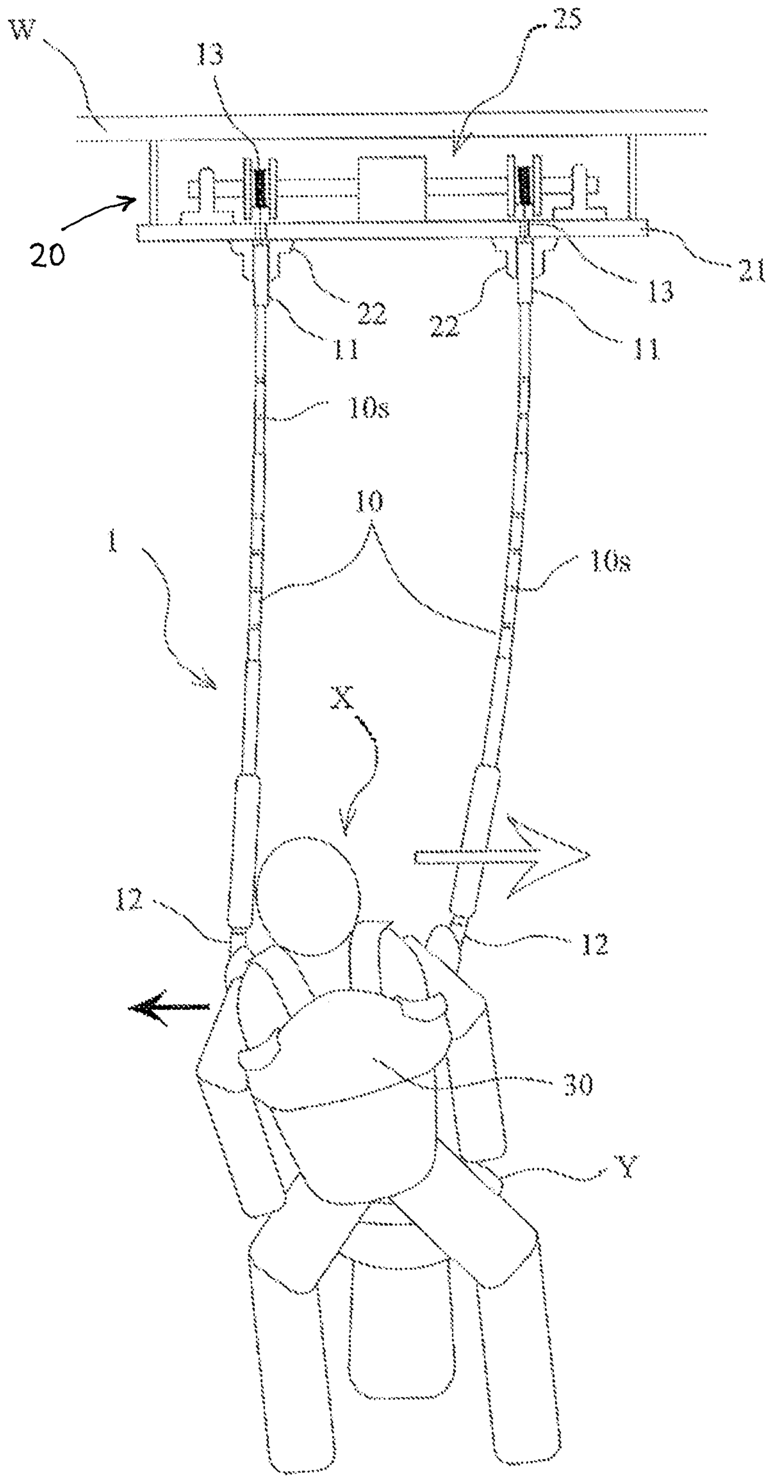
FIG. 3 is a diagram for explaining how the assistance device 1 of FIGS. 1A and 1B support a care receiver X tilted sideways.

A case in which the care receiver X who stands up or sits down near the toilet seat Y unsteadily tilts to the left or right (the direction indicated by the black arrow in the figure), as illustrated in FIG. 3, will be described. Since the base end 11 of the pipe 10 is supported so as not to be angularly displaced in that direction, the pipe 10 bends as illustrated in the figure, and thus applies, as a repulsive force, a force in a direction that effects pulling back of the care receiver X (the direction indicated by the white arrow in the figure), to the care receiver X via the torso support 30.

Further, regarding the motion of the care receiver X in the front-back direction (the direction perpendicular to the paper plane of FIG. 3), since the base end 11 of the pipe 10 can be angularly displaced in that direction only within a limited certain range, the pipe 10 can exert a force in the direction that effects pulling back while allowing motion within a necessary range. That is, if the care receiver X unsteadily tilts and the torso support 30 is excessively displaced forward or backward, the pipe 10 bends in the direction of the displacement and applies a force in a direction that effects pulling back of the care receiver X to the original position or posture.

Figure 4A:
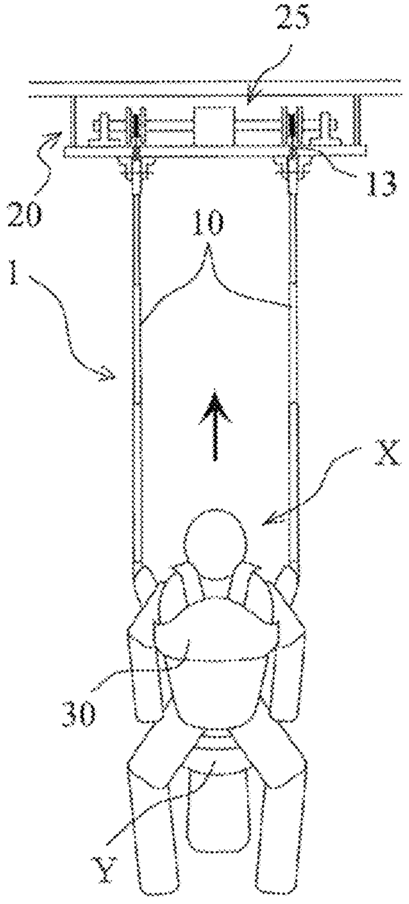
FIGS. 4A and 4B are front views of when the care receiver X uses the assistance device 1 provided in the toilet.
Figure 4B:
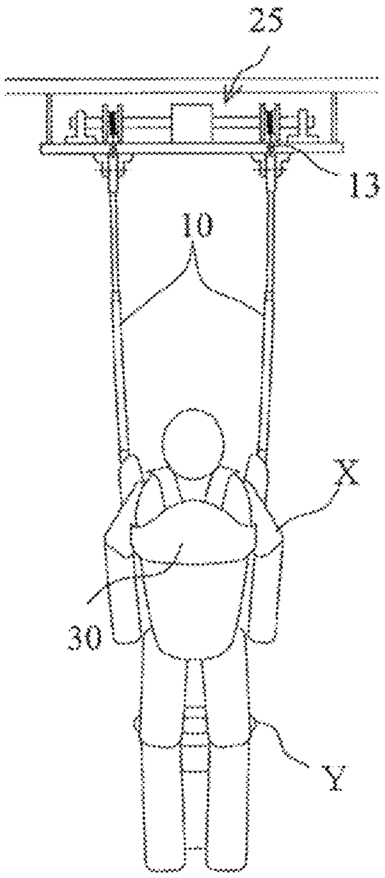

When the care receiver X site down on or stands up from the toilet seat Y in the toilet, the assistance device 1 provides support as illustrated in FIGS. 4A and 4B. That is, when the care receiver X in a sitting posture as illustrated in FIG. 4A stands up, the wire 13 passed through the pipe 10 is wound up by the operation mechanism 25 to pull up the torso support 30. This makes it possible to easily help the care receiver X to stand up, as illustrated in FIG. 4B. When the care receiver X in a standing posture sits down on the toilet seat the wire 13 is wound off while using braking by the operation mechanism 25 to lower the torso support 30 and the care receiver X. When the driving force (pulling force), degree of braking, lowering speed, etc. of the operation mechanism 25 can be adjusted according to the residual ability of the care receiver X (strength of the legs, or the like), providing assistance can also facilitate maintenance of the physical strength of the care receiver X, which is preferable.

To always appropriately pulling up the care receiver X to a preferable height according to the height and posture of each person, the surface of the narrower tube of the pipe 10 may be graduated (reference numeral 10*s* in FIG. 3) or have coloration using different colors corresponding to a scale. To properly perform pulling up, a scale reading or a color optimum for each care receiver may be memorized and pulling up may be stopped when the end of the thicker pipe reaches the level of the optimum scale reading or the like with respect to the thinner tube.

Figure 5A:
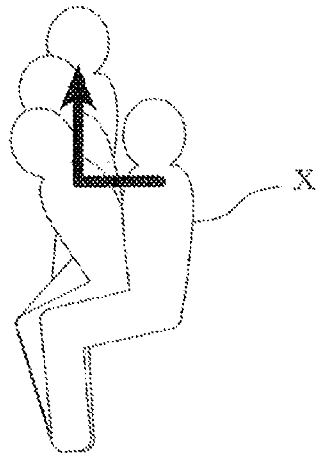
FIG. 5A is a schematic diagram of a typical movement when the care receiver X in a sitting posture stands up.
Figures 5B, 5C, 5D, 5E:
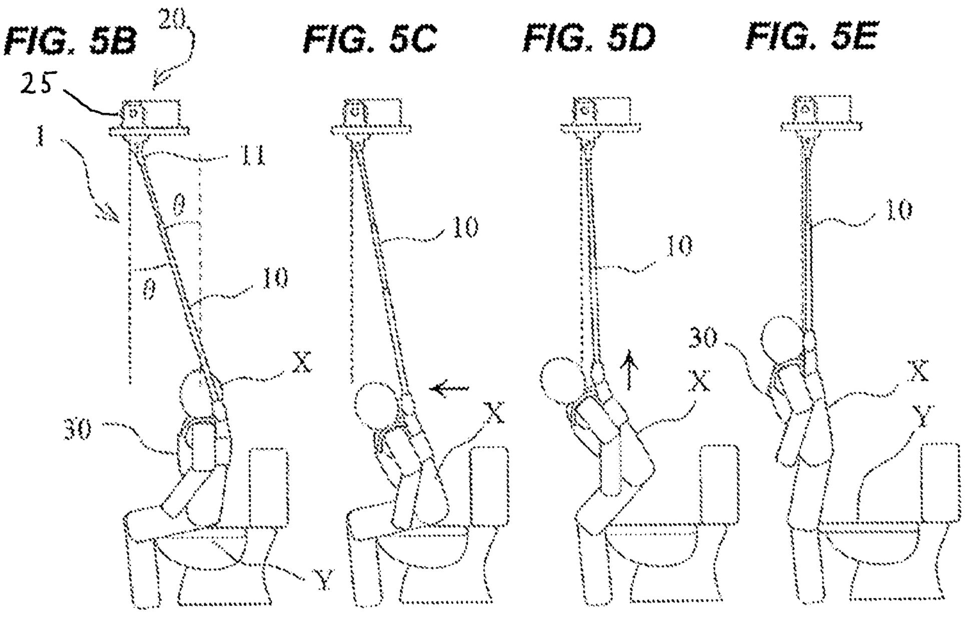
FIGS. 5B to 5E are side views which depict steps when the care receiver X stands up using the assistance device 1 in the toilet.

The smoothest way for the care receiver X in a sitting posture to stand up is firstly shifting his/her body weight forward, and then stretching upward, as illustrated in FIG. 5A. Thus, in the illustrated assistance device 1, the upper support unit 20 including the operation mechanism 25 is attached to the ceiling portion W at a position slightly forward of a position directly above the toilet seat Y, as illustrated in FIG. 5B. As a result, the base end 11 of the pipe 10 is located forward of a position directly above the care receiver X, and thus the pipe 10 is connected to the care receiver X in a sitting posture, in a state of being inclined forward at an angle θ, as illustrated in the figure. When the operation mechanism 25 is driven to wind up the wire 13 in the pipe 10, the assistance device 1 first pulls the care receiver X upward and slightly forward, and then pulls the care receiver X substantially straight upward (FIGS. 5B to 5E). In this way, it is possible to smoothly help the care receiver X to stand up. Similarly, to smoothly help the care receiver X to sit down on the toilet seat Y, it is preferable that the care receiver X is slowly lowered at an angle slightly inclined forward. Note that, from the viewpoint of easy operation, the forward inclination angle θ of the pipe 10 is preferably 0 degrees to 45 degrees, and most suitably 3 degrees to 20 degrees.

It is preferable that the upper support unit 20 is configured to be horizontally movable, for example, in the front-back direction (the left-right direction in FIGS. 5B to 5E), because, for example, the most appropriate angle of the pipe 10 for the care receiver X to move can be selected. In that case, it is preferable that the base end of the pipe can move at least within a range including a position directly above where the care receiver X sits and a position forward of the position directly above where the care receiver X sits.

Figure 6A:
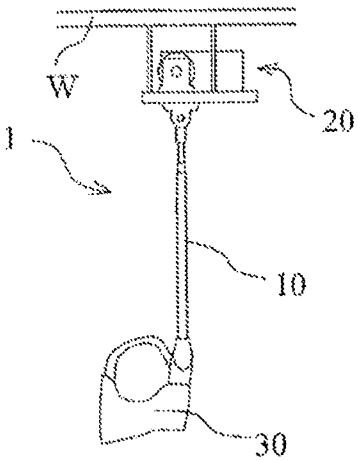
FIGS. 6A and 6B are a side view and a view from the front underside of the assistance device 1 illustrated in FIGS. 1A and 1B, respectively.
Figure 6B:
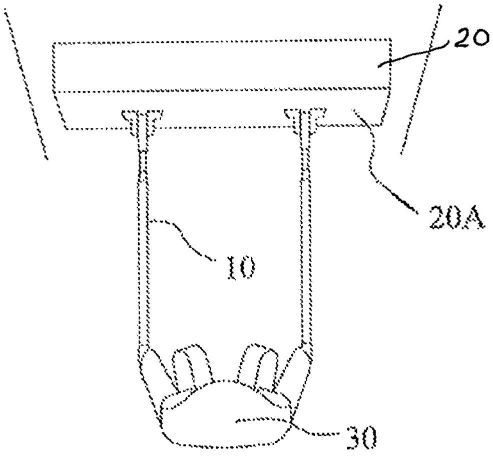

FIGS. 6A and 6B depict a side view and a view from the front underside of the assistance device 1 illustrated in FIGS. 1A to 5E. In the assistance device 1, the upper support unit 20 is fixed to the ceiling portion W as described above (see FIG. 6A), and a cover 20A is attached to the upper support unit 20 to prevent adhesion of dust to the operation mechanism 25 and the like (see FIG. 6B. In the FIG. 6A, the cover 20A is not illustrated).

Figure 7A:
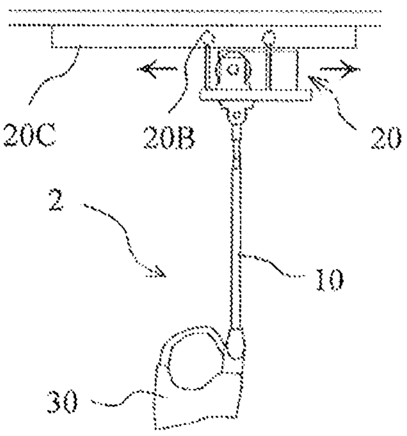
FIGS. 7A to 7C are a side view, a front view, and a view from the front underside of an assistance device 2, respectively, and the assistance device 2 includes a horizontally movable upper support unit 20.
Figure 7B:
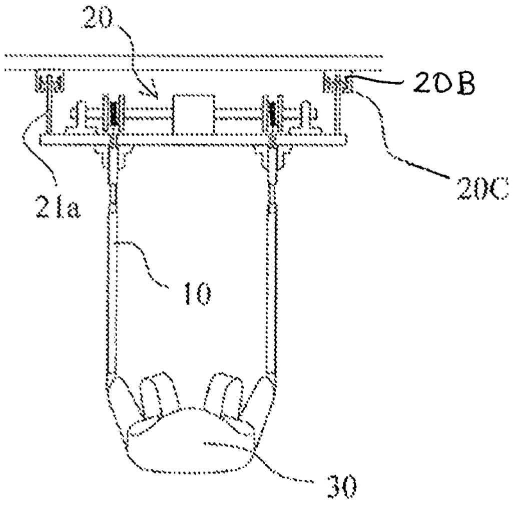
Figure 7C:
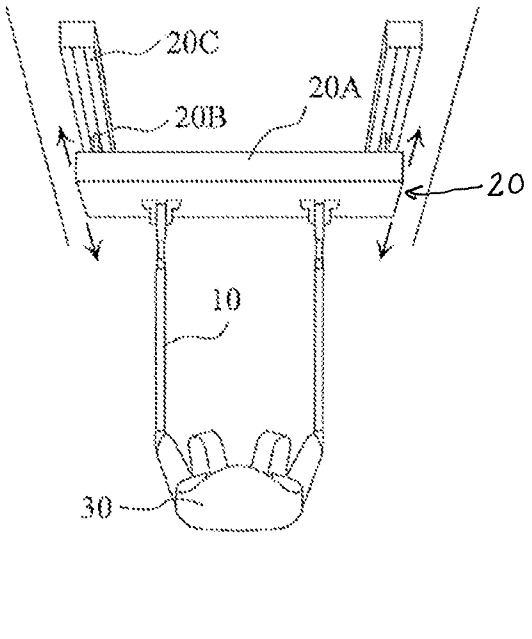

FIGS. 7A to 7C depict an example of an assistance device 2 in which the upper support unit 20 can horizontally move in the front-back direction. To enable horizontal movement, a wheel 20B is provided in the upper portion of each of the connection members 21*a* of the upper support unit 20, and the wheels 20B are configured to move along the inside of guide rails 20C attached to the underside of the ceiling portion W so as to extend in the front-rear direction. When some of the wheels 20B are drive wheels coupled to a motor or the like, the upper support unit 20 can be reciprocally moved in the front-back direction along the rails 20C by operating a switch or the like. A braking function to fix the position of the wheel 20B is also provided. Reference numeral 20A designates a cover (however, the cover 20A is not illustrated in FIGS. 7A and 7B).

When the upper support unit 20 can move horizontally, the torso support 30 can be moved in the front-back direction together with the pipe 10, and thus it is possible to assist the care receiver X to move in the front-back direction. The care receiver X can also be pulled up from an appropriate position in an appropriate direction, and thus it is possible to assist, in a most smooth manner, the care receiver X to stand up, sit down, and otherwise move. When the upper support 20 is further configured to move backward of the care receiver X (backward of the toilet seat Y), it is possible to put away the pipes 10 and the like near the rear wall or the like when not in use.

Figure 8A:
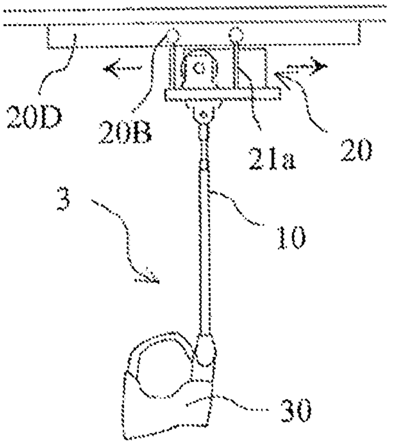
FIGS. 8A to 8C are a side view, a front view, and a view from the front underside of an assistance device 3, respectively, and the assistance device 3 includes a horizontally rotatable upper support unit 20.
Figure 8B:
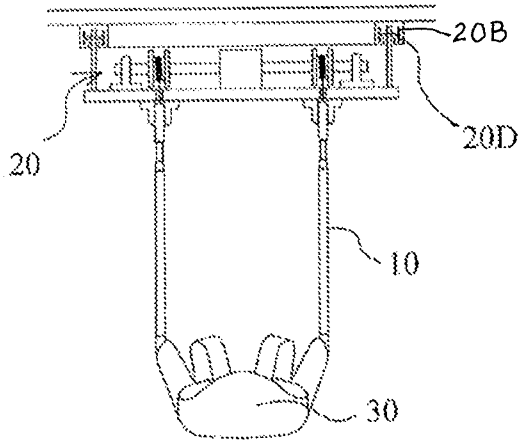
Figure 8C:
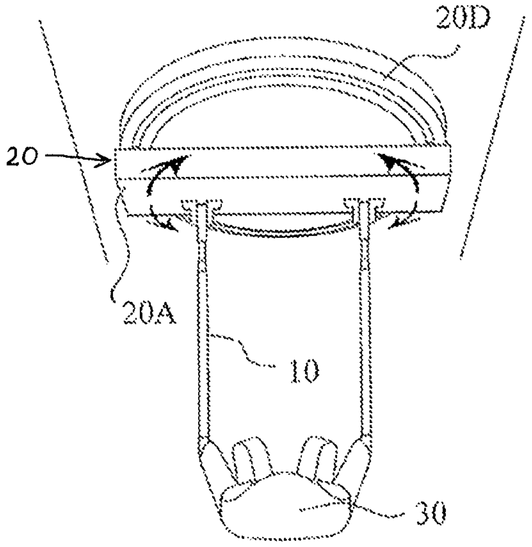

FIG. 8A to 8C depict an example of an assistance device 3 in which the upper support unit 20 can rotate in a horizontal plane. Similar to the example of FIGS. 7A to 7C, the wheel 20B is provided in the upper portion of each of the connection members 21*a* of the upper support unit 20, and the wheels 20B are configured to move along the inside of a guide rail 20D attached to the underside of the ceiling portion W so as to provide an annular path (the wheels 20B are configured to be positionally fixable). Similarly, when some of the wheels 20B are drive wheels, the upper support unit 20 can be freely rotated horizontally along the rail 20D (also in FIGS. 8A to 8C, the cover 20A is illustrated only in FIG. 8C and is not illustrated in FIGS. 8A and 8B).

When the upper support unit 20 is configured to rotate horizontally the assistance device 3 can appropriately assist the care receiver X to stand up from the wheelchair turn his/her body and sit down on the toilet seat, and then again turn his/her body and return to the wheelchair.

Figure 9A:
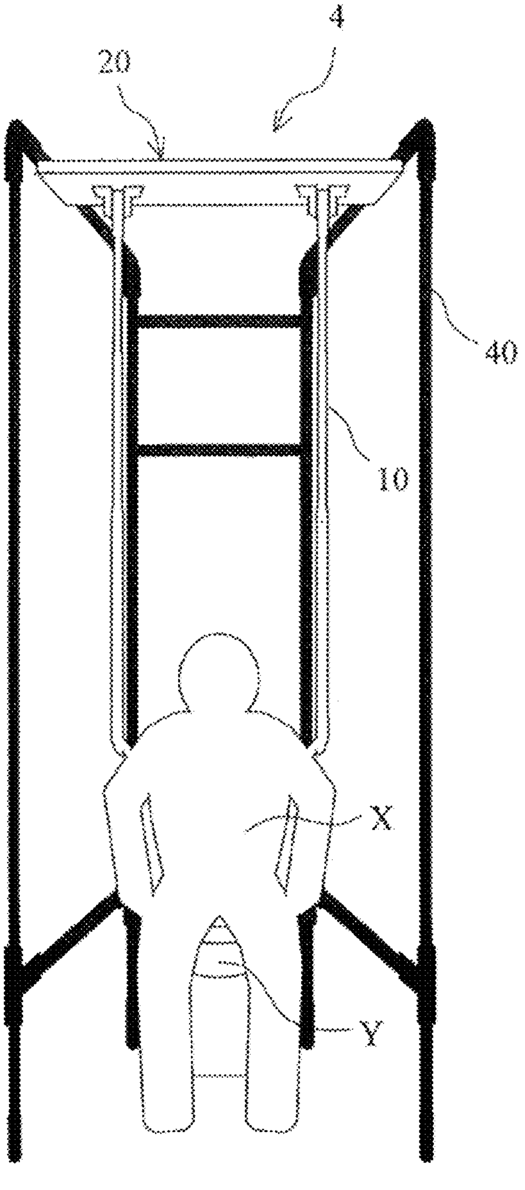
FIGS. 9A and 9B are front views of an assistance device according to another embodiment.
Figure 9B:
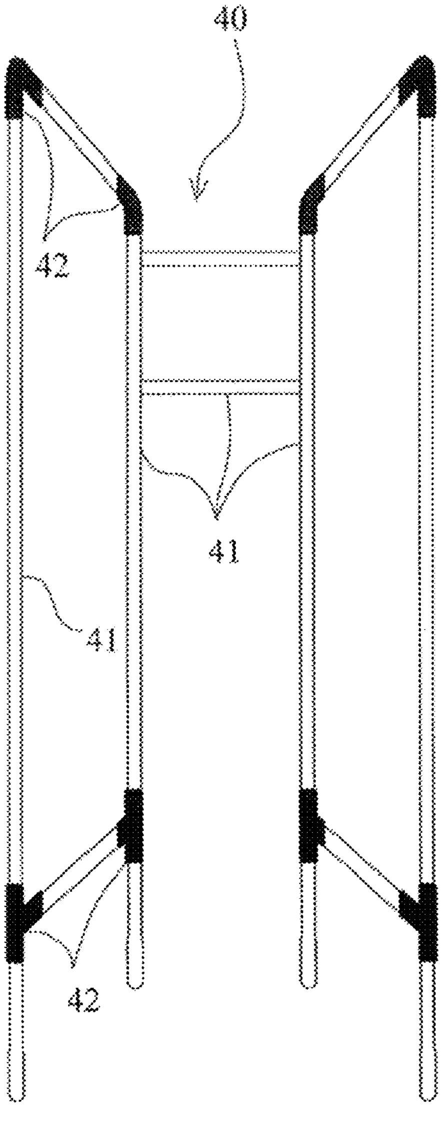

To assist an elderly person or the like in a room where the ceiling portion W or the like cannot be used to install the device due to, for example, structural reasons of the building, or at a place other than a place of residence, an accommodation facility, or the like, it is preferable to use a support frame 40 to assemble a simple assistance device, as illustrated in FIGS. 9A and 9B.

As illustrated in FIG. 9B, the support frame 40 is a vertically long frame that can be stably self-supported, and the height of the uppermost portion of the support frame 40 is about 1.8 m to about 4 m. Straight parts 41 are made of a carbon fiber reinforced plastic, bent portions/connector parts 42 are made of aluminum alloy or the like, and thus the support frame 40 can be disassembled and assembled. Since the main parts are made of a carbon fiber reinforced plastic, the support frame 40 is lightweight, and can be easily divided at the connector parts into separate pieces for carrying.

The support frame 40 can also be formed of a fiber reinforced plastic using fibers other than carbon fibers. If the support frame 40 is not carried around, the main parts or the like may be made of metal.

By assembling the support frame 40 illustrated in FIG. 9B, an assistance device 4 illustrated in FIG. 9A can be constructed at a place where the care receiver stands up or sits down, such as a toilet, a bathroom, or a bed in any place, such as a place other than a place of residence or the like. Specifically, by assembling the support frame 40 and then fixing, to the upper portion of the support frame 40, the upper support unit 20 to which the pipe 10 capable of being extended and shortened is attached, as in the examples of FIGS. 1A and 1B and the like, the simple type assistance device 4 can be constructed, as illustrated in FIG. 9A. Furthermore, a wire or the like may be passed through the inside of the pipe 10 and the upper support unit 20 may be provided with an operation mechanism as described above, to pull up the care receiver X, for example. However, even if such an operation mechanism or the like is not provided, the device 4 of FIG. 9A can provide the minimum assistance. That is, although the assistance device 4 does not pull up or lower the care receiver X, the assistance device 4 extends or shortens the pipe 10 having a telescopic structure to follow the motion of the care receiver X when he/she stands up or sits down, and if the care receiver X unsteadily tilts forward, backward, leftward, or rightward, the pipe 10 is bent and a repulsive force is generated, and thus the pipe 10 applies a force such that the care receiver X recovers the original posture.

A wire or the like may be passed through the inside of the pipe 10 and the upper support unit 20 may be provided with an operation mechanism that is configured to be manually operated and does not include a motor as described above. By moving the wire upward or downward using a manual mechanism including a manual handle, ratchet, connecting rod, transmission device, etc., the assistance device 4 can pull up the care receiver X to help him/her to stand up, or lower the care receiver X to help him/her to sit down.

Instead of the wire in this example, a line member such as a rope or another pull member can be used.

Figure 10A:
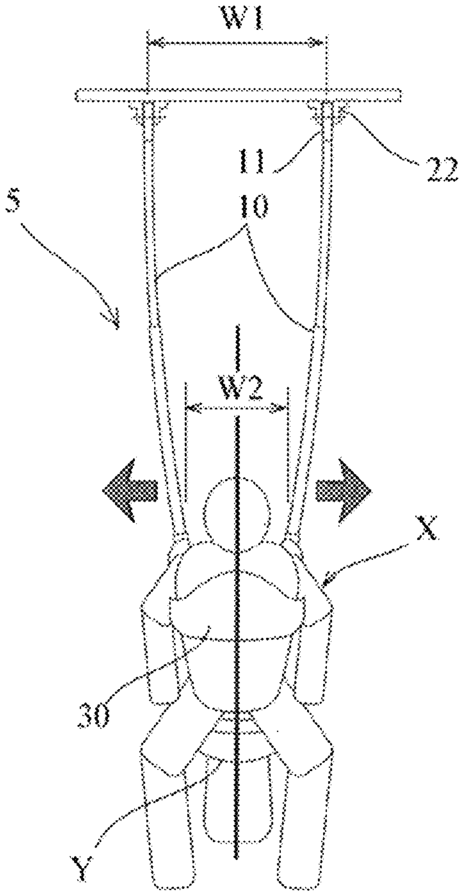
Figure 10B:
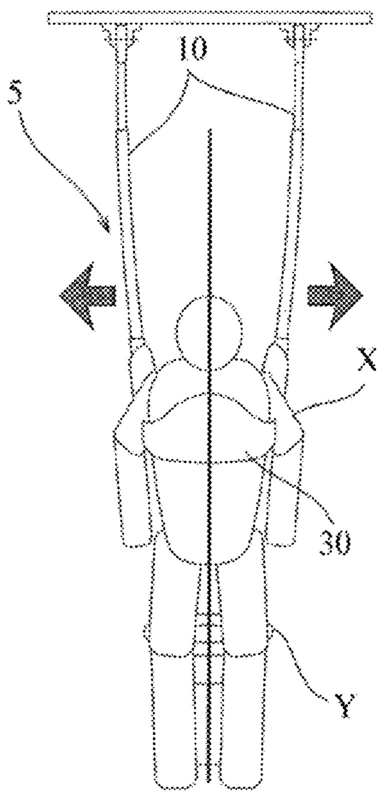

FIGS. 10A to 10E depicts an assistance device 5 in which the pipe 10 is used in a characteristic manner. FIG. 10A depicts a state in which the care receiver X sits on the toilet seat Y, and FIG. 10B depicts a state in which the care receiver X stands up from the toilet seat Y.

In the assistance device 5, the two pipes 10 as described with reference to the assistance devices 1 to 4 illustrated in FIGS. 1A and 1B and the like, are used to support the torso support 30. However, the assistance device 5 is characterized in that a distance W1 between the base ends 11 of the two pipes 10 attached to the supports 22 at an upper position is wider than a distance W2 between the two pipes 10 at the connection portion with the torso support 30 at a lower position, and as a result, both of the pipes 10 are elastically bent to form left and right outward convex shapes, respectively. The upper supports 22 support the pipes 10 so as not to tilt to the left and right, and thus setting the interval W1 to be wider than the interval W2 causes both of the pipes 10 to elastically deform so as to form an outward convexly curved shape. As in the examples of FIGS. 1A and 1B and the like, each of the pipes 10 includes a plurality of tubes made of a fiber reinforced plastic and being connected to form a telescopic structure capable of being extended and shortened, and a pull wire or the like is passed through the inside of the pipe 10.

When the two pipes 10 are used in a state of being bent outward, as described above, the care receiver X can be supported more stably than when the pipes 10 are parallel. The increased stability can easily be felt by actually using the assistance device 5. However, the reason why the stability is increased can be explained as follows, with reference to FIGS. 10C to 10E.

Figure 10C:
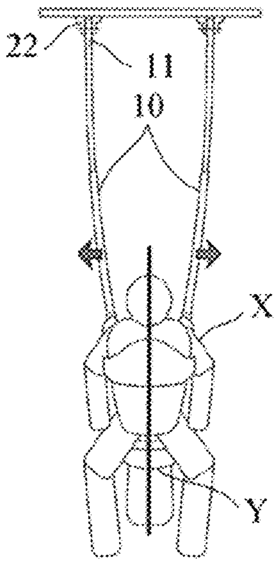

1) in a state in which the care receiver X using the assistance device 5 does not tilt and is in the central position (normal position) (FIG. 10C), each of the two pipes 10 exerts, on the care receiver X, a force in the direction of the arrow illustrated in FIG. 10C. These forces are applied in opposite directions and have the same magnitude, and thus as a result of composition of these forces, the care receiver X does not receive a force in any direction.

2) If the care receiver X is slightly tilted to the left or right from the state of FIG. 10C (FIG. 10D), one of the pipes 10 is further bent, and thus exerts an increased force (repulsive force) tending to pull back the care receiver X to the center. However, the other of the pipes 10 becomes substantially straight, and thus exert substantially no force on the care receiver X. Thus, as a result of composition of the forces from both of the pipes, a force tending to pull back the care receiver X is slightly increased (due to only the bending of one of the pipes 10) and acts on the care receiver X.

Figure 10D:
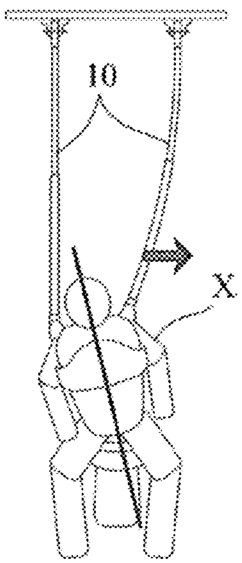
Figure 10E:
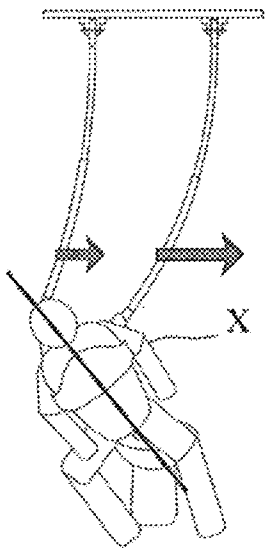

3) If the care receiver X is tilted further from the state of FIG. 10D (FIG. 10E), both of the two pipes 10 are greatly bent. Thus, due to elastic forces from the two pipes 10, a strong force tending to pull back the care receiver X acts on the care receiver X.

From when the care receiver X loses his/her balance and slightly tilt to the left or right until the inclination of the care receiver X is increased, the force tending to pull back the tilted care receiver X that applied by the two pipes 10 via the torso support 30 is slowly increased through the state of 2). Thus, for example, an undesirable situation in which a strong force suddenly acts on the care receiver X and thus the care receiver X is tilted to the opposite side, do not occur.

Figure 11A:
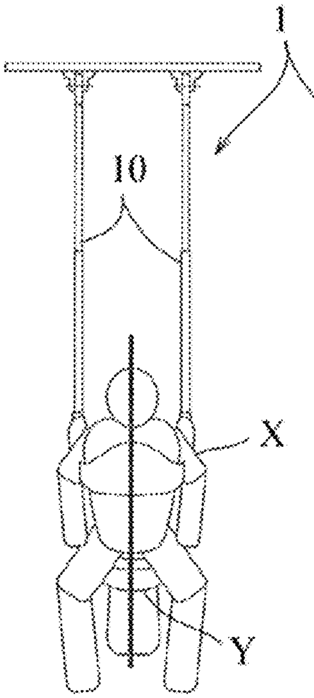
FIGS. 11A to 11C depict a state in which the care receiver X using an assistance device 1 of FIGS. 1A and 1B or the like including two pipes 10 extending in parallel (or substantially parallel), sits straight on the toilet seat Y, a state in which the care receiver X is slightly tilted to the right side of the care receiver X, and a state in which the care receiver X is greatly tilted to the same side, respectively.
Figure 11B:
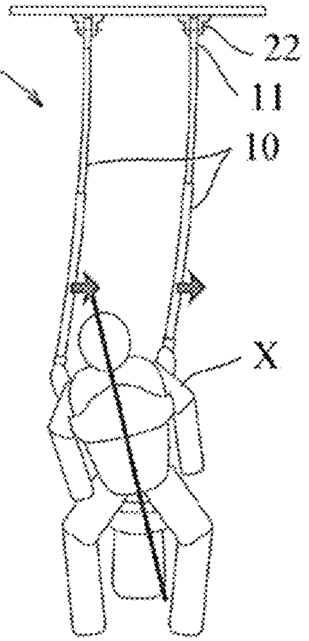
Figure 11C:
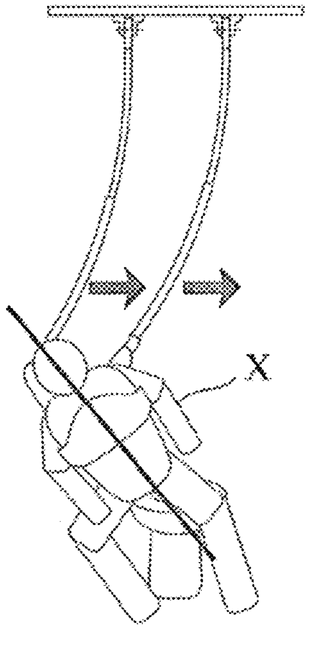

The above-described characteristics regarding stability of the assistance device 5 of FIGS. 10A and 10B can easily be understood using comparison with FIGS. 11A to 11C which depict changes in force when the two pipes 10 are arranged in parallel (or substantially parallel).

i) In the state where the care receiver X is in the central position (FIG. 11A), neither of the pipes 10 exerts a force on the care receiver because the two pipes 10 are straight.

ii) If the care receiver X is slightly tilted to the left or right (FIG. 11B), both of the pipes 10 bend in the same direction and exert a force tending to pull back the care receiver X to the center. Thus, as a result of composition of the forces from both of the pipes, a slightly strong force tending to pull back the care receiver X acts.

iii) if the care receiver X is tilted further (FIG. 11C), both of the two pipes 10 greatly bend and exert a strong force tending to pull back the care receiver X.

In the state of ii) where the care receiver X loses his/her balance and tilts slightly to the left or right, a force tending to pull back the tilted care receiver X exerted by the two pipes 10 already tends to be strong. Thus, depending on the setting of strength of the pipes 10, swaying may not be stopped smoothly and the care receiver X may be excessively moved through the center position to the opposite side, for example.

Figure 12A:
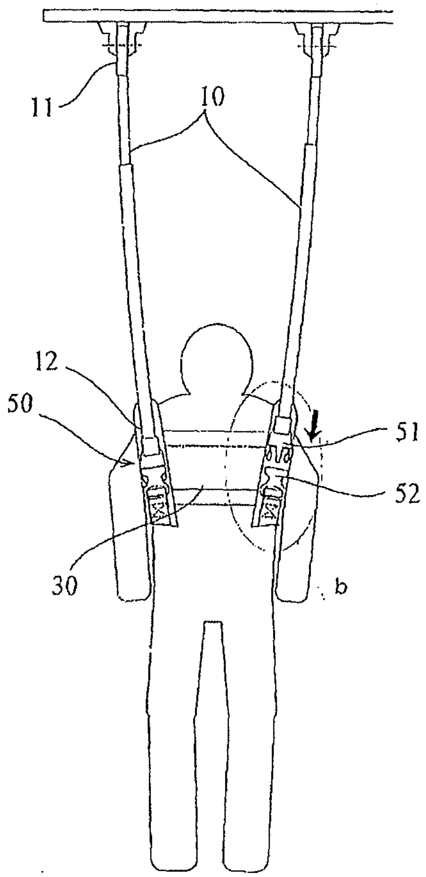
FIGS. 12A to 12C are views of detachable connection between the leading end of the pipe 10 and the torso support 30 by using an insertion-type connector (buckle) 50.

FIG. 12A depicts a preferable connection state between the lower end of the pipe 10 and the torso support 30. Each of the pipes 10 and the backside portion of the torso support 30 are connected by an insertion-type connector (buckle) 50 that can be easily attached and detached, and that is illustrated in FIGS. 12B and 12C.

Figures 12B, 12C:
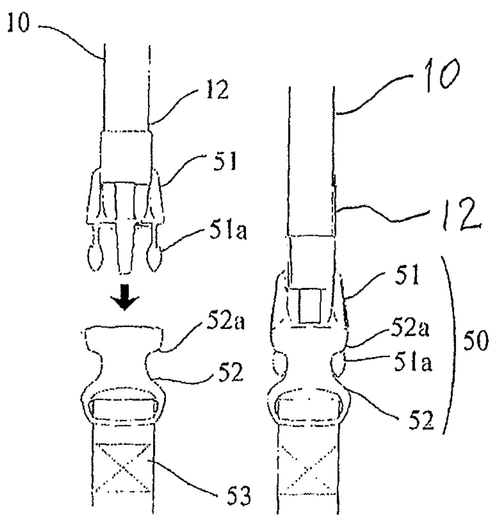

The connector 50 includes a male member 51 and a female member 52, as illustrated in the FIG. 12B, and the male member 51 is fixed to an end (connection portion 12) of the pipe 10, as illustrated in the FIG. 12A, and the female member 52 is integrated with the torso support 30 via the connecting belt 53. In this case, the wire or the like passed through the inside of the pipe 10 is connected to the male member 51.

The members 51 and 52 of the connector 50 are coupled by inserting one of the members 51 and 52 into the inside of the other of the members 51 and 52, as illustrated in FIG. 12C. Two claws 51*a* of the male member 51 are inserted into an annular portion of the female member 52 and engaged with engaging pieces 52*a*, and as a result, the male member 51 is connected with the female member 52. By pinching the claws 51*a* by hand from the outside and applying an inward force, the claws 51*a* on both sides are disengaged from the engaging pieces 52*a*, and thus the male member 51 can be disconnected from the female member 52, as illustrated in the FIG. 12B.

Using the connector 50 to connect the leading end of the pipe 10 and the torso support 30 allows the care receiver to select and use the torso support 30 having a size suitable for his/her body shape. In addition, by attaching the torso support 30 to the care receiver X in advance, the torso support 30 can be connected to the pipes 10 in a toilet or the like within a very short time (for example, within 20 seconds), and then the care receiver X can use the assistance device.

Note that the connection between the pipe 10 and the torso support 30 by using the connector 50 can be adopted in any of the assistance devices 1 to 5 described in the above examples.

INDUSTRIAL APPLICABILITY

The invention according to the present application can be used in, for example, an industry that provides elderly people or handicapped people with assistance and support for maintenance of physical strength, or that provides devices for those purposes.

The invention claimed is:

1. An assistance device to support a body of a care receiver, comprising flexible pipes and a torso support configured to be attached to a torso of the care receiver, wherein:

a number of said flexible pipes or tubular members is two, each of the pipes is made of fiber reinforced plastic, a base or upper end of each of the two pipes is configured to be attached at least indirectly to a room, and leading or lower ends of the two pipes are connected to the torso support on opposing sides thereof, said torso support being exclusively suspended by said two flexible pipes, and the pipes are flexible and configured to bend in response to application of an external force, thereby causing the torso support and an attached user shift in a given direction, and bending of the pipes causes the pipes to exert a restoring force in an opposite direction to the given direction such that an original position of the torso support and user can be recovered.

2. The assistance device according to claim 1, wherein the base or upper end of each of the pipes is attachable at least indirectly to the room to prevent pivoting of the base or upper end about one axis, or angular displacement of the base or upper end in at least one direction, and to allow limited pivoting of the base or upper end in a range of about a different axis, or limited angular displacement in another direction.

3. The assistance device according to claim 1, wherein each of the pipes are configured to elastically bend in response to externally applied force so as to temporarily form opposing outwardly convex shapes, respectively.

4. The assistance device according to claim 1, wherein the leading or lower end of the pipes are connected to the torso support by respective detachable insertion-type connectors.

5. The assistance device according to claim 1, wherein each of the pipes has a telescopic structure having a variable length, and a pull member is passed through each of the pipes, further comprising an operation mechanism configured to move the torso support by operation of the pull member.

6. The assistance device according to claim 1, wherein the torso support is provided with a motion sensor.

7. The assistance device according to claim 5, wherein the base or upper end of each of the pipes is located at a position directly above a toilet seat or forward of the position.

8. The assistance device according to claim 5, further comprising an upper support unit, wherein the base or upper end of each of the pipes is connected to said upper support unit and inclinable by 0 to 45 degrees with respect to a vertical.

9. The assistance device according to claim 1, further comprising an upper support unit, wherein the base or upper end of each of the pipes is attached to the upper support unit, and at least a part of the upper support unit is configured to horizontally move so as to move the base or upper end of each of the pipes alternately in opposing directions.

10. The assistance device according to claim 1, further comprising an upper support unit, wherein the base or upper end of each of the pipes is attached to the upper support unit, and at least a part of the upper support unit is configured to rotate so as to horizontally revolve the base or upper end of each of the pipes along a circumferential path.

11. The assistance device according to claim 1, wherein:

each of the pipes includes a plurality of tubes, the plurality of tubes having different diameters and being telescopically connected;

an outer tube of the plurality of tubes includes, at one end thereof, an engaging step facing inward; and another tube of the plurality of tubes is fitted into the outer tube and includes, at an end oriented in a reverse orientation with respect to the one end having the engaging step facing inward, an engaging step facing outward.

12. The assistance device according to claim 1, wherein each respective one of the pipes has a layered structure including a layer of fibers extending in a length direction of the respective one of the pipes and a layer of fibers extending in a circumferential direction of the respective one of the pipes.

13. The assistance device according to claim 11, wherein the outer tube of the plurality of tubes is connected to the torso support and is the leading or lower end of the respective one of the pipes.

14. The assistance device according to claim 1, further comprising an upper support unit and a support frame, wherein the base or upper end of each of the pipes is attached to the upper support unit, and the upper support unit is detachably attached to an upper portion of the support frame, the support frame being configured to be self-supported on a floor of the room.

15. A support frame for the assistance device according to claim 1, wherein the support frame is configured to be self-supported on a floor of the room, and the support frame is further configured such that the base or upper end of each of the pipes is detachably attached to an upper portion of the support frame.

* * * * *